(12) United States Patent
Morrell

(10) Patent No.: US 9,340,139 B1
(45) Date of Patent: May 17, 2016

(54) TRAILER RAMP SYSTEM

(71) Applicant: Christopher Ron Morrell, Mandan, ND (US)

(72) Inventor: Christopher Ron Morrell, Mandan, ND (US)

( * ) Notice: Subject to any disclaimer, the term of this patent is extended or adjusted under 35 U.S.C. 154(b) by 0 days.

(21) Appl. No.: 14/483,532

(22) Filed: Sep. 11, 2014

(51) Int. Cl.
*B60P 1/43* (2006.01)

(52) U.S. Cl.
CPC ..................................... *B60P 1/435* (2013.01)

(58) Field of Classification Search
CPC ............ B60P 1/43; B60P 1/431; B60P 1/435; B60P 3/07; A61G 3/061; A61G 3/06; A61G 3/062; B65G 69/30; B65G 69/2811; B65G 69/28

See application file for complete search history.

(56) References Cited

U.S. PATENT DOCUMENTS

| | | | | |
|---|---|---|---|---|
| 3,288,522 A * | 11/1966 | Norton | ...................... | B60P 1/43 105/458 |
| 3,319,811 A * | 5/1967 | Martin, Jr. | .............. | B60P 1/435 414/537 |
| 3,763,827 A | 10/1973 | Burkart | | |
| 3,972,428 A * | 8/1976 | Love, Jr. | ................. | B60P 1/435 296/57.1 |
| 4,133,437 A * | 1/1979 | Gates | .................... | B60P 1/4428 187/200 |
| 4,493,603 A * | 1/1985 | Williams | ................. | A61G 3/06 414/541 |
| 5,380,145 A * | 1/1995 | Czaplewski | ........... | B65G 69/30 14/71.1 |
| 5,538,307 A * | 7/1996 | Otis | ........................ | B60P 1/435 296/61 |
| 6,042,330 A * | 3/2000 | Egan | .................... | A61G 7/1017 212/237 |
| 6,764,121 B1 * | 7/2004 | Bauer | ..................... | B60P 1/435 296/37.6 |
| 7,445,268 B2 * | 11/2008 | Faulkiner | ................ | B60P 1/431 296/183.1 |
| 7,488,025 B1 | 2/2009 | Roberson | | |
| 8,347,440 B1 * | 1/2013 | Runyan | ................... | B60P 1/435 14/71.1 |
| 2012/0061987 A1* | 3/2012 | Fraley | ................ | B62D 33/0273 296/51 |
| 2013/0094931 A1 | 4/2013 | Bluhm | | |
| 2014/0119863 A1* | 5/2014 | Hill | .......................... | B60P 1/43 414/537 |

\* cited by examiner

*Primary Examiner* — Glenn Myers

(74) *Attorney, Agent, or Firm* — Neustel Law Offices; Jason L. Gilbert

(57) ABSTRACT

A trailer ramp system which may be easily transitioned between a rested position against the inner wall of a trailer and a lowered position extending out of the trailer. The trailer ramp system generally includes one or more ramps which are adjustable between a first storage position against an inner wall of a trailer and a second lowered position extending out of the trailer for use in loading or unloading objects. A mount rod is utilized in combination with a rotational assembly and an L-bar to allow the ramp to be adjusted into various positions. An anchor on the inner wall of the trailer may be utilized with a locking pin to secure the ramp against the inner wall in its storage position. Two or more ramps may be utilized in combination with each other for loading or unloading vehicles such as ATV's or UTV's.

7 Claims, 11 Drawing Sheets

TRAILER RAMP SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a ramp system and more specifically it relates to a trailer ramp system which may be easily transitioned between a resting position against the inner wall of a trailer and a lowered position extending out of the trailer.

2. Description of the Related Art

Any discussion of the related art throughout the specification should in no way be considered as an admission that such related art is widely known or forms part of common general knowledge in the field.

Ramps are well known to aid in loading and offloading various objects into or out of a raised enclosure such as a trailer. Ramps are typically included for use with such trailers either in a completely detached format which requires that a user manually install, remove and transport the ramp or in a format which retracts within an enclosure below the trailer entrance. Such retracting ramps are well known as being difficult to operate and are prone to causing injuries (such as pinching fingers between the ramp and the enclosure).

Because of the inherent problems with the related art, there is a need for a new and improved trailer ramp system which may be easily transitioned between a resting position against the inner wall of a trailer and a lowered position extending out of the trailer.

BRIEF SUMMARY OF THE INVENTION

The invention generally relates to a ramp assembly which includes one or more ramps which are adjustable between a first storage position against an inner wall of a trailer and a second lowered position extending out of the trailer for use in loading or unloading objects. A mount rod is utilized in combination with a rotational assembly and an L-bar to allow the ramp to be adjusted into various positions. An anchor on the inner wall of the trailer may be utilized with a locking pin to secure the ramp against the inner wall in its storage position. Two or more ramps may be utilized in combination with each other for loading or unloading vehicles such as ATV's or UTV's. The present invention is primarily for use with livestock and other animal hauling trailers, or other trailers which are not fully enclosed. However, any type of trailer may be utilized with the present invention.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
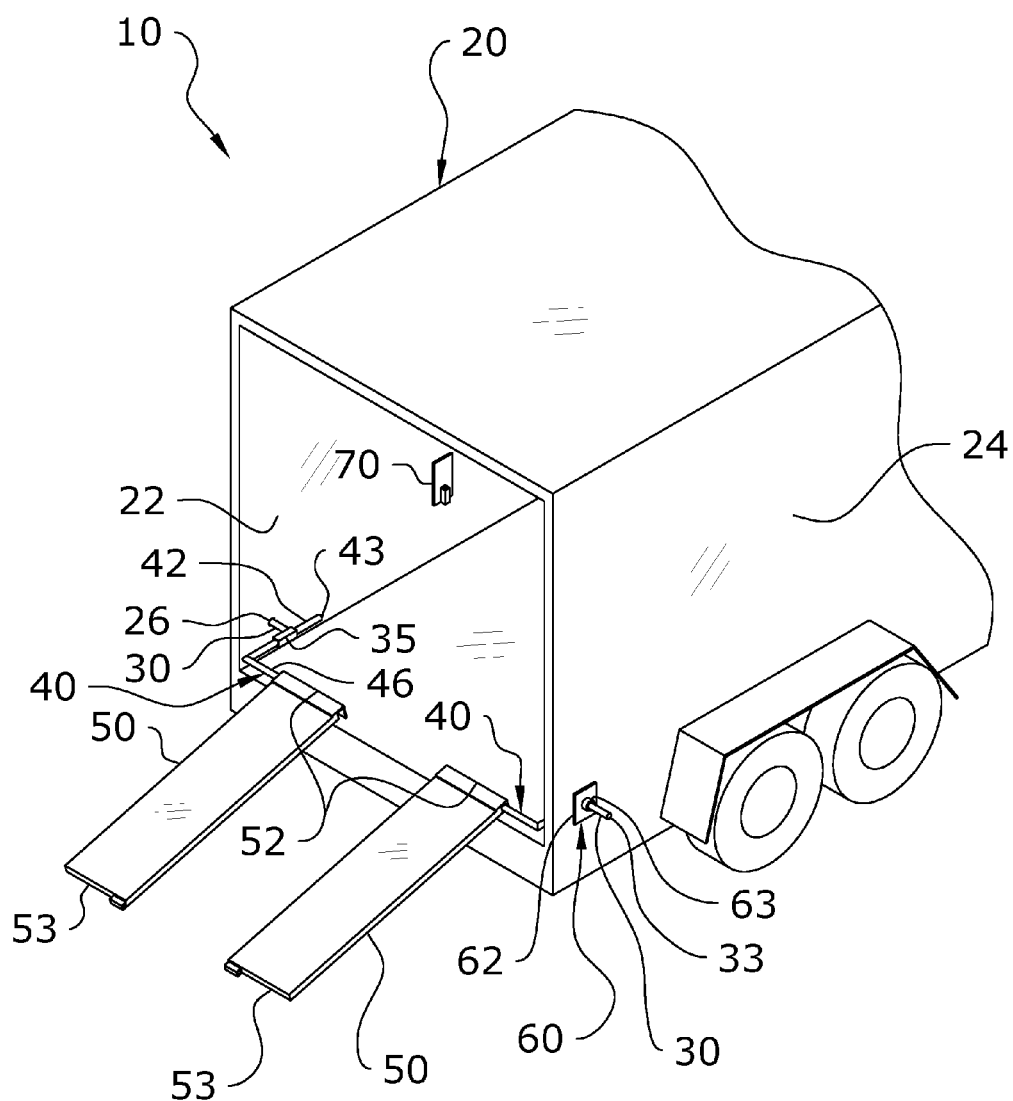
FIG. 1 is an upper perspective view of the present invention in use in a trailer.

A. Overview.

Turning now descriptively to the drawings, in which similar reference characters denote similar elements throughout the several views, FIGS. 1 through 12 illustrate a trailer ramp system 10, which comprises one or more ramps 50 which are adjustable between a first storage position against an inner wall 22 of a trailer 20 and a second lowered position extending out of the trailer 20 for use in loading or unloading objects. A mount rod 30 is utilized in combination with a rotational assembly 60 and an L-bar 40 to allow the ramp 50 to be adjusted into various positions. An anchor 70 on the inner wall 22 of the trailer 20 may be utilized with a locking pin 75 to secure the ramp 50 against the inner wall 22 in its storage position. Two or more ramps 50 may be utilized in combination with each other for loading or unloading vehicles such as ATV's or UTV's.

B. Trailer.

The present invention is adapted for use with a wide range of trailers 20 or other devices which would benefit from one or more ramps 50. While a conventional trailer 20 is shown in the figures, this should not be construed as limiting on the scope of the present invention. Various types of trailers 20 may be utilized with the present invention, as well as loading docks, raised garages, platforms, or other raised structures. Preferably, the present invention will be used with open-enclosure trailers 20, such as those commonly used for hauling animals.

The trailer 20 will generally include inner walls 22 which face inwardly toward its internal compartment and outer walls 23 which face outwardly from the trailer 20. For each ramp 50 utilized with the present invention, an opening 26 will be formed between the inner and outer walls 22, 23 at the location(s) where the ramp(s) 50 will be mounted. For example, the figures illustrate the usage of two ramps 50, with corresponding openings 26 being visible on the first and second side walls of the trailer 20.

C. Mounting and Rotational Assemblies.

Figure 2:
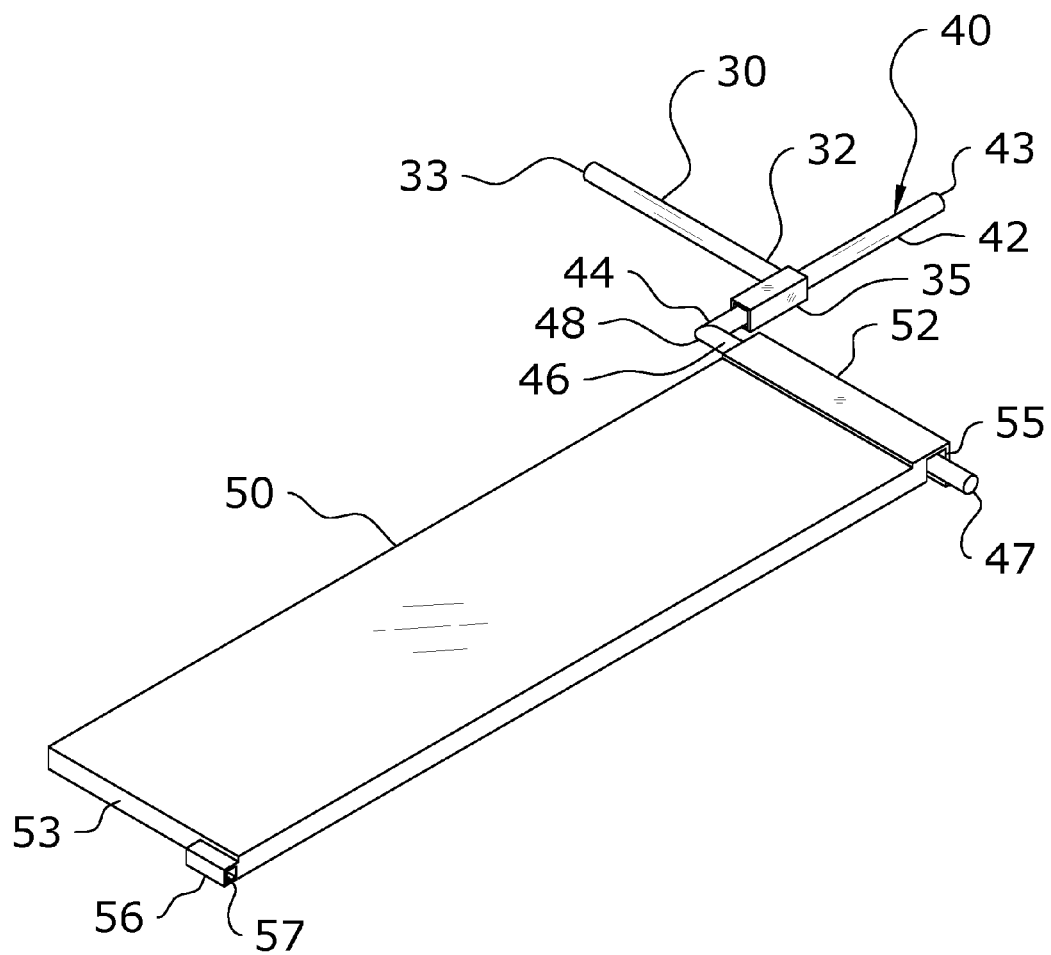
FIG. 2 is an upper perspective view of the present invention.
Figure 3:
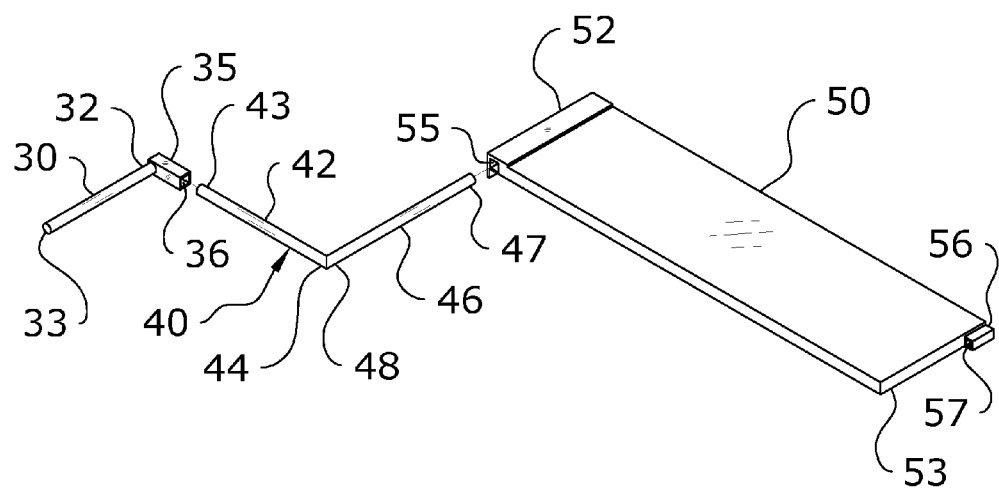
FIG. 3 is an upper perspective view of the present invention with the mount bar, L-bar and ramp aligned but separated.
Figure 4:
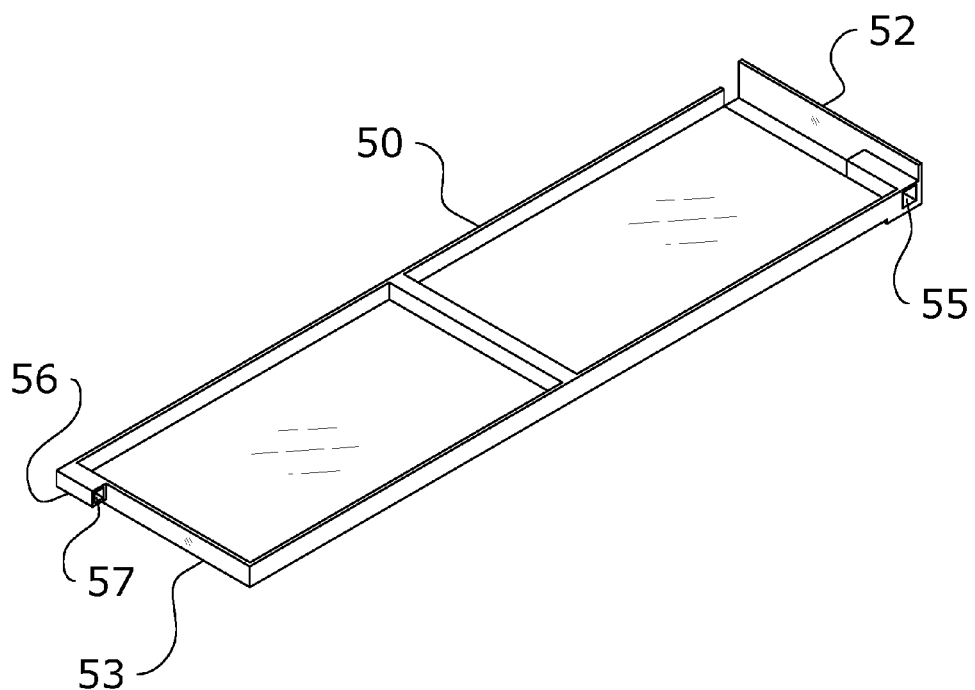
FIG. 4 is a lower perspective view of the ramp.
Figure 5:
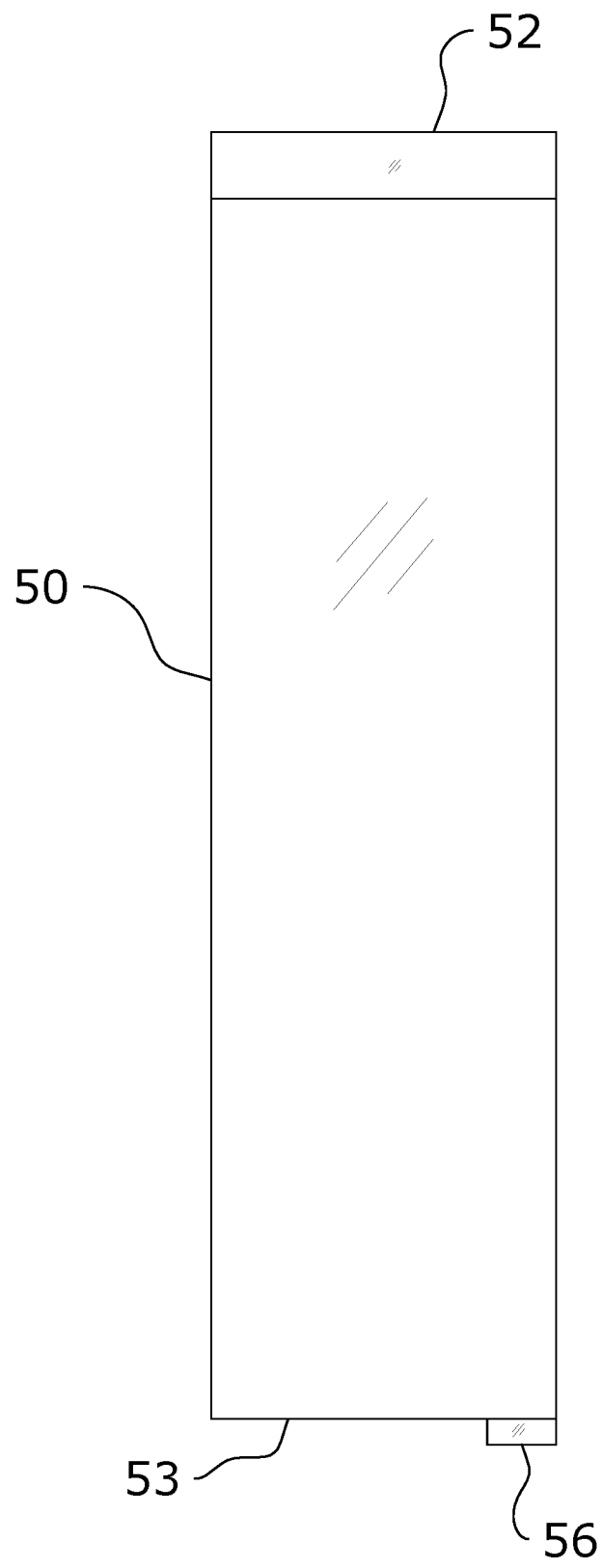
FIG. 5 is a top view of the ramp.
Figure 6:
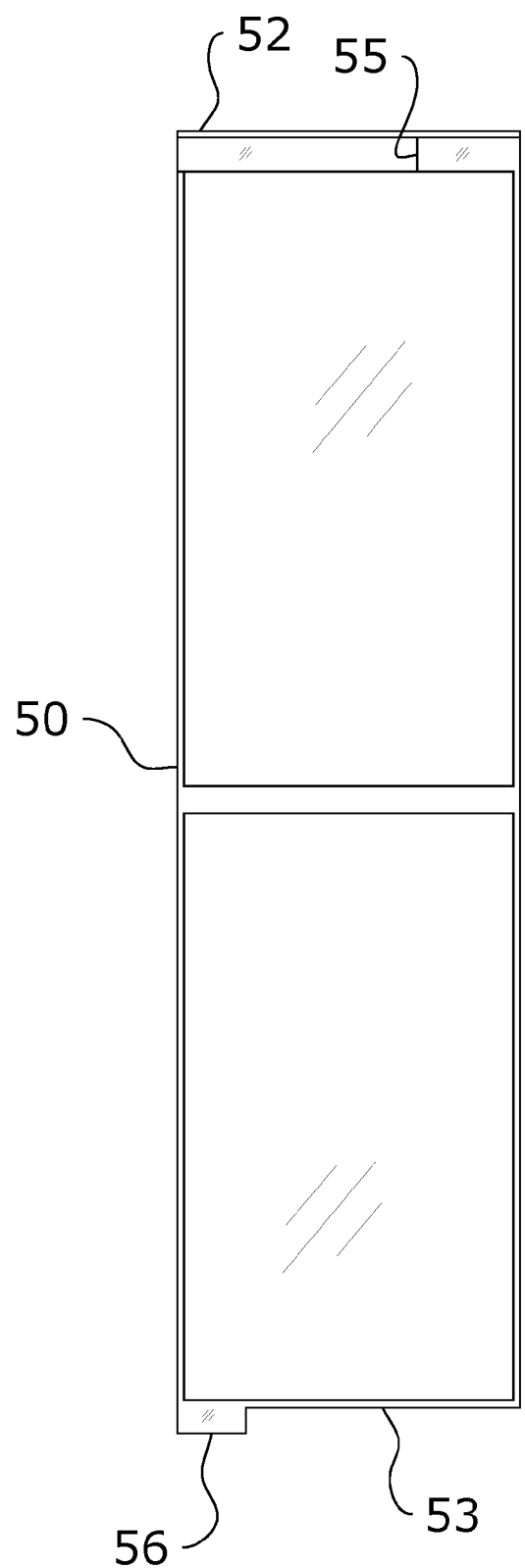
FIG. 6 is a bottom view of the ramp.
Figure 7:
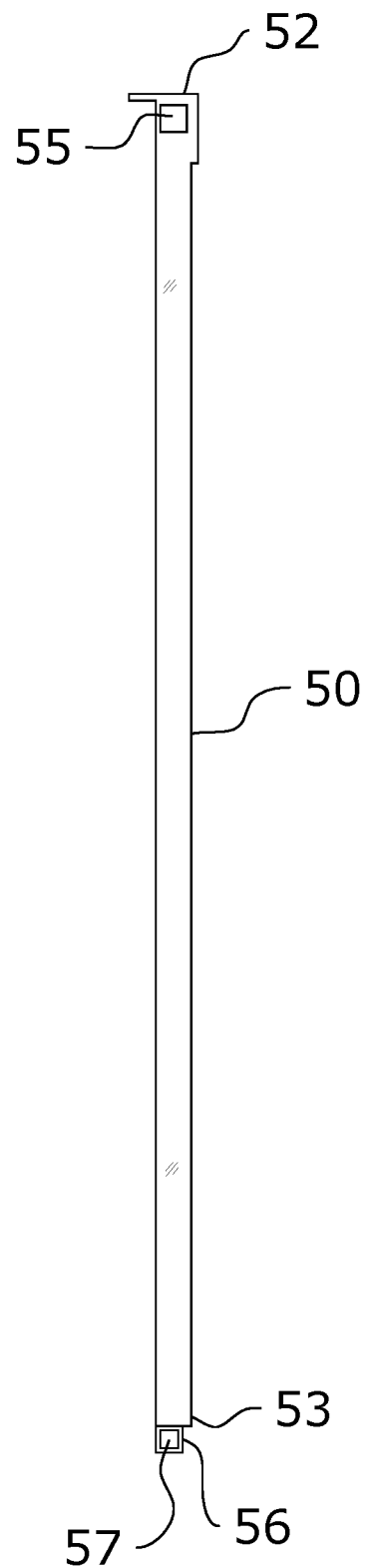
FIG. 7 is a side view of the ramp.
Figure 8:
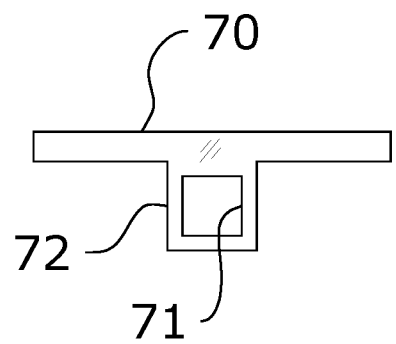
FIG. 8 is a top view of an anchor of the present invention.
Figure 9:
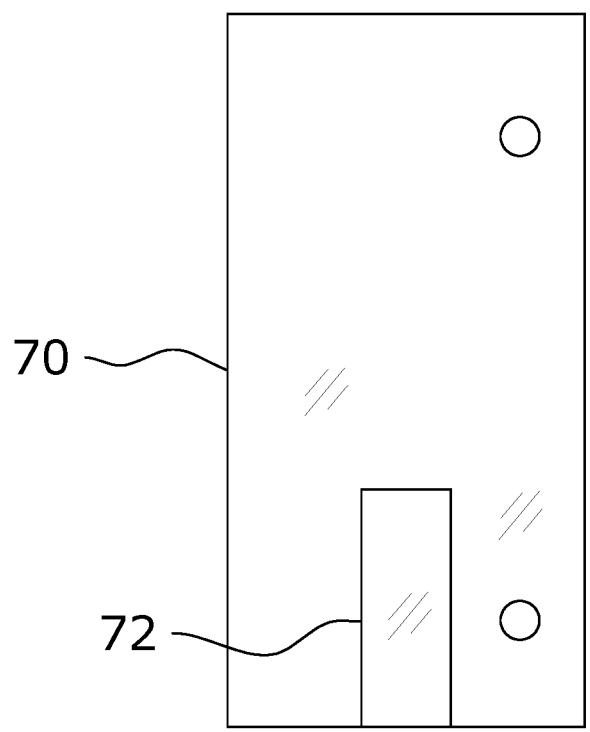
FIG. 9 is a frontal view of an anchor of the present invention.

The mounting and rotational assemblies of the present invention allow the one or more ramps 50 to be transitioned between a number of positions as shown in the figures. The primary mounting assembly for the ramp 50 of the present invention comprises a mount rod 30 having a first end 32 and a second end 33 as best shown in FIGS. 2 and 3. The length, size, and cross-section of the mount rod 30 may vary in different embodiments of the present invention and should not be limited in construction by the exemplary figures.

The first end 32 of the mount rod 30 includes a cross receiver 35 adapted to rotationally receive the first portion 42 of the L-bar 40 of the present invention. The cross receiver 35 comprises an elongated member having an inner channel 36 passing therethrough. The first portion 42 of the L-bar 40 rotationally extends through the inner channel 36. The second end 33 of the mount rod 30 extends through the opening 26 of the trailer wall 22 as well as the rotational assembly 60 of the present invention which is positioned on the outer wall 24 of the trailer 20.

The L-bar 40 of the present invention acts to interconnect the rotational assembly with the ramp 50 by connecting between the ramp 50 and the mount rod 30. As best shown in FIGS. 2 and 3, the L-bar 40 comprises a first portion 42 and a second portion 46 which extends at a right angle with respect to the first portion 42 to form an L-shape.

The first portion 42 of the L-bar 40 comprises an elongated rod having a first end 43 and a second end 44. The second portion 42 of the L-bar 40 similarly comprises an elongated rod having a first end 47 and a second end 48. The second end 44 of the first portion 42 is connected at a right angle to the second end 48 of the second portion 42 of the L-bar 40. The first end 43 of the first portion 42 extends through the inner channel 36 of the cross receiver 35 of the mount rod 30 in a rotational manner. The first end 47 of the second portion 46 extends through the mount slot 55 on the underside of the inner end 52 of the ramp 50 as discussed herein.

The rotational assembly 60 of the present invention allows the mount rod 30 to rotate within the opening 26 of the trailer's 20 inner wall 22. While various devices and configurations may be utilized, a preferred embodiment of the present invention includes a rotational assembly 60 comprised of a plate 62 and bushing 63 which are secured to the outer wall 24 of the trailer 20 around the opening 26. The second end 33 of the mount rod 30 is extended through the bushing 63 to allow the mount rod 30 to rotate within the opening 26.

D. Ramp.

The present invention utilizes one or more ramps 50 which may be rotationally secured to the inner walls 22 of a trailer 20 or other enclosure. Each of the ramps 50 may be transitioned between a plurality of positions for use or storage. While the figures illustrate usage of a pair of ramps 50, it should be appreciated that more or less ramps 50 may be utilized in different embodiments.

Each ramp 50 includes an inner end 52 and an outer end 53. The inner end 52 remains anchored near the entrance to the trailer 20 with the mounting and rotational assemblies such that the ramp 50 may be rotated and adjusted about its inner end 22 into various positions for usage or storage. The length, size, shape, and configurations of the ramps 50 may vary in different embodiments, and should not be construed as limited by the exemplary figures.

The inner end 52 of the ramp 50 includes a mount slot 55 which may be formed on the underside of the ramp 50 adjacent to its inner end 52. The mount slot 55 may be formed by various means, such as by use of a flange or angle iron. The second portion 46 of the L-bar 40 is slidably positioned within the mount slot 55 as shown in the figures.

The outer end 53 of the ramp 50 includes an anchoring receiver 56 having an inner channel 57 extending therethrough. The anchoring receiver 56 comprises a bracket or other hollow, elongated member which extends along the outer end 53 of the ramp 50 so that a locking pin 75 may be extended therethrough to lock the ramp 50 against the inner wall 22 of the trailer 20 using the anchor 70 as discussed herein.

E. Anchor.

Figure 10:
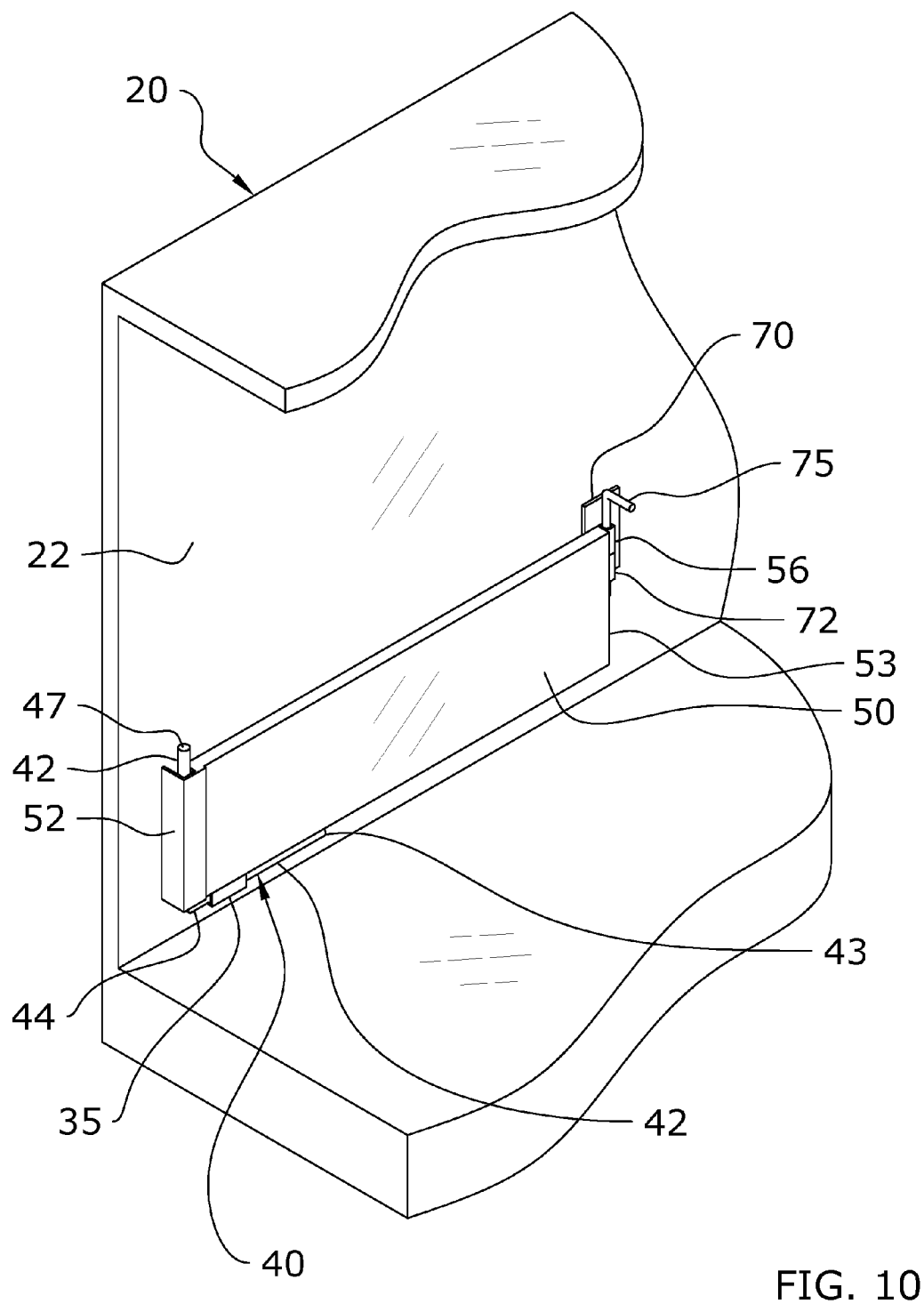
FIG. 10 is an upper perspective view of a ramp in a resting position against the inner wall of a trailer.
Figure 12:
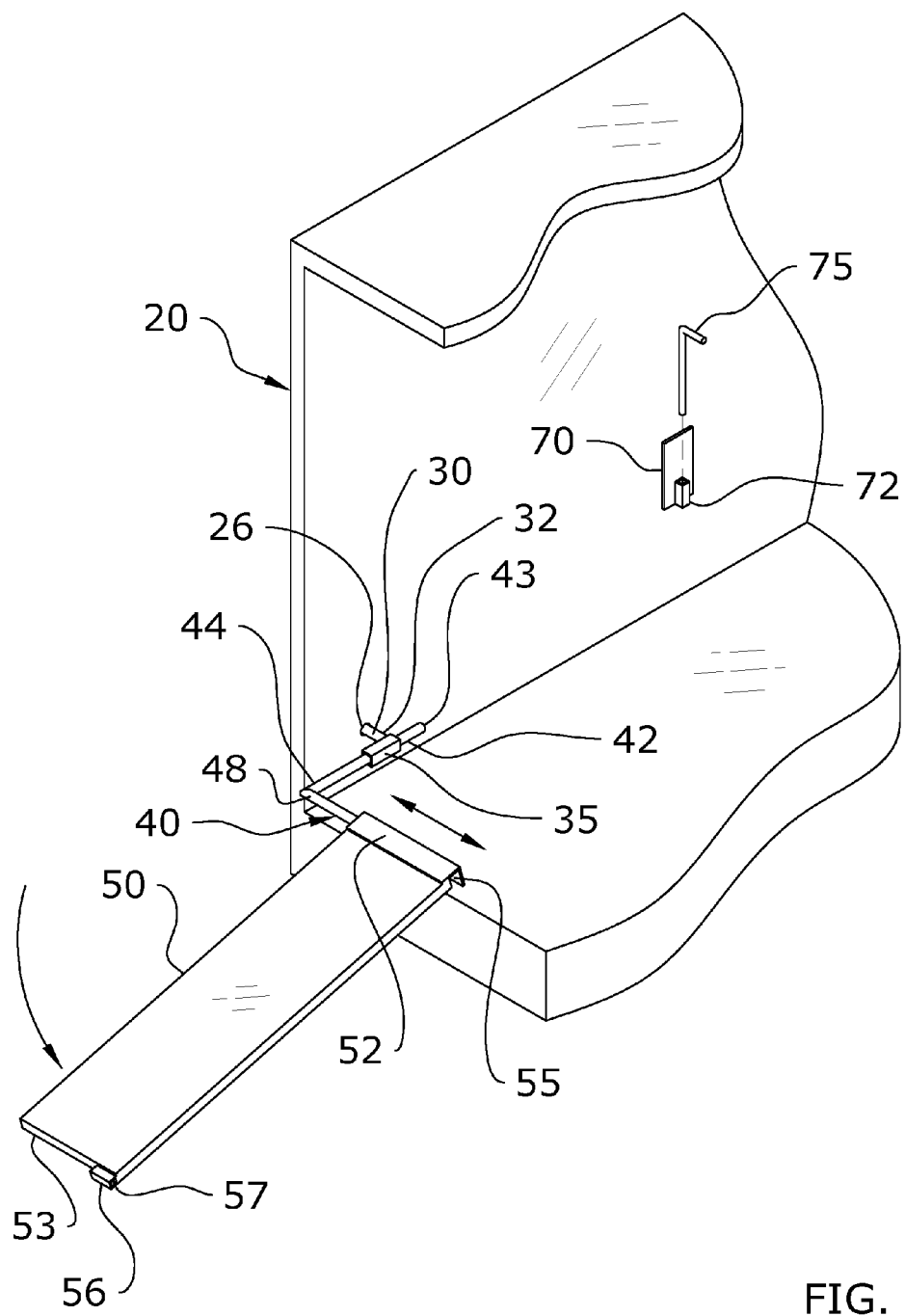
FIG. 12 is an upper perspective view of the ramp lowered for usage and being adjusted for optimal positioning.

The present invention utilizes an anchor 70 to store the ramp 50 in its retracted storage position along the inner wall 22 of the trailer 20 as shown in FIG. 10. The anchor 70, which is best shown in FIG. 12, comprises one or more pin receivers 72 which are mounted on the inner wall 22 of the trailer 20. Each pin receiver 72 includes an inner channel 73 adapted to receive a locking pin 75. When the ramp 50 is retracted and flipped up against the inner wall 22 as shown in FIG. 10, the locking pin 75 will extend through both the pin receivers 72 and the anchoring receiver 56 on the outer end 53 of the ramp 50 to lock the ramp 50 against the inner wall 22.

F. Operation of Preferred Embodiment.

Figure 11:
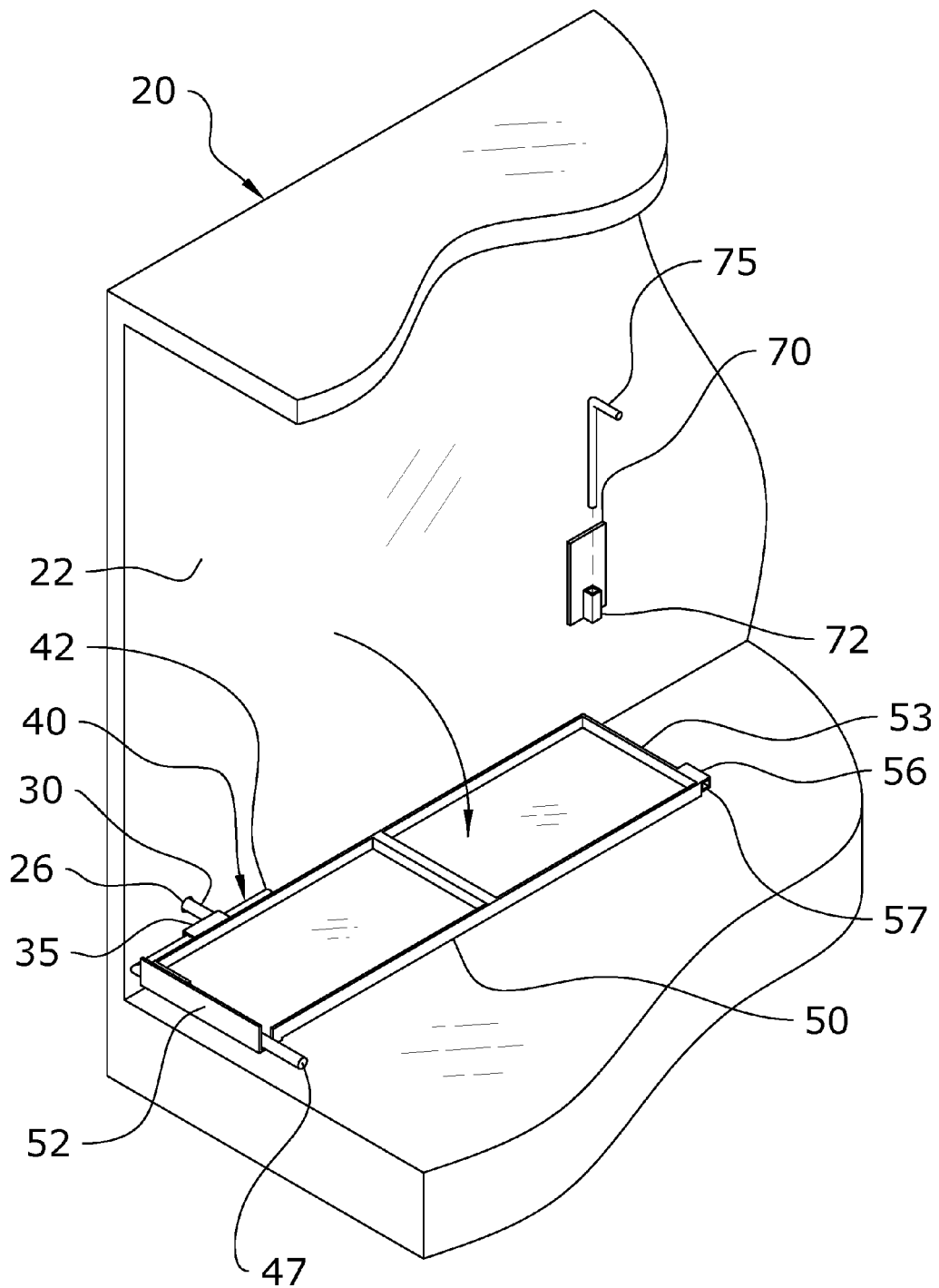
FIG. 11 is an upper perspective view of the ramp flipped down from the trailer's inner wall.

In use, the ramp 50 may be stored against the inner wall 22 of the trailer 20 as shown in FIG. 10. When desired, the locking pin 75 may be removed and the ramp 50 may be rotated outwardly as shown in FIG. 11. The inner end 52 of the ramp 50 is secured to the L-bar 40 via the mount slot 55 such that the inner end 52 of the ramp 50 may be rotated about the second portion 46 of the L-bar 40.

After rotating the ramp 50 away from the inner wall 22 of the trailer 20, the ramp 50 may be flipped downwardly as shown in FIG. 12. The first portion 42 of the L-bar 40 rotates within the cross receiver 35 of the mount rod 30 to allow the ramp 40 to be flipped downward for use. If desired, the inner end 52 of the ramp 50 may be adjusted along the second portion 46 of the L-bar 40 as shown in FIG. 12.

With the ramp 50 in a lowered position, it may be utilized to load various objects into the trailer 20 or enclosure. FIG. 1 illustrates an embodiment which utilizes a pair of ramps 50. This configuration would be well-suited for loading or unloading of vehicles such as ATV's or UTV's into or out of the trailer 20.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A trailer ramp system, comprising:
   a trailer having an inner wall and an outer wall;
   a mount rod rotatably positioned within an opening of said inner wall, wherein said mount rod extends through said inner wall and said outer wall;
   a cross receiver extending from said mount rod;
   an L-bar including a first portion and a second portion extending at a right angle with respect to said first portion, wherein said first portion of said L-bar is rotatably secured to said mount rod by said cross receiver, wherein said first portion of said L-bar is oriented at a right angle with respect to said mount rod;
   a ramp, wherein an inner end of said ramp is slidably and rotatably connected to said second portion of said L-bar such that said ramp may be transitioned between a resting position against said inner wall of said trailer and a lowered position extending out of said trailer;
   an anchoring receiver positioned on an outer end of said ramp; and
   an anchor secured against said inner wall, wherein said mount receiver is adapted to be removably connected to said anchor by a locking pin.

2. The trailer ramp system of claim 1, wherein said mount rod is rotatably positioned within said rotational assembly.

3. The trailer ramp system of claim 2, wherein said rotational assembly includes a bushing.

4. The trailer ramp system of claim 3, wherein said rotational assembly includes a plate secured against an outer wall of said trailer.

5. The trailer ramp system of claim 1, wherein said anchor includes one or more pin receivers.

6. The trailer ramp system of claim 5, wherein said locking pin is adapted to extend through said one or more pin receivers of said anchor and through said anchoring receiver of said ramp to secure said ramp against said inner wall of said trailer.

7. The trailer ramp system of claim 1, wherein said first portion of said L-bar rotatably extends through said cross receiver of said mount rod.

\* \* \* \* \*